United States Patent
Roychoudhury et al.

(10) Patent No.: US 10,066,431 B2
(45) Date of Patent: Sep. 4, 2018

(54) BELLOWS SPRING DAMPER

(71) Applicant: FORD GLOBAL TECHNOLOGIES, LLC, Dearborn, MI (US)

(72) Inventors: Raj S. Roychoudhury, Bloomfield Hills, MI (US); Raymond Anthony Oldani, Canton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/085,262

(22) Filed: Mar. 30, 2016

(65) Prior Publication Data

US 2017/0284141 A1    Oct. 5, 2017

(51) Int. Cl.
*B60N 3/12* (2006.01)
*E05F 3/00* (2006.01)
*B60R 7/06* (2006.01)
*F16F 9/04* (2006.01)

(52) U.S. Cl.
CPC .............. *E05F 3/00* (2013.01); *B60R 7/06* (2013.01); *F16F 9/0418* (2013.01); *E05Y 2201/21* (2013.01); *E05Y 2900/538* (2013.01)

(58) Field of Classification Search
CPC .............. A61M 16/00; A61M 16/0075; A61M 16/0081; B60T 13/58; Y10T 137/7781; B60G 2202/152; B60G 2202/314; B60G 2204/1262; B60G 15/12; F04D 29/668
USPC ....................................................... 296/37.12
See application file for complete search history.

(56) References Cited

U.S. PATENT DOCUMENTS

| 2,372,863 | A | * | 4/1945 | Stuart | ....................... F23N 3/04 |
| | | | | | 110/189 |
| 3,715,798 | A | * | 2/1973 | Ostroot | ................... F16F 13/00 |
| | | | | | 29/454 |
| 3,830,257 | A | * | 8/1974 | Metivier | ............... A61M 16/00 |
| | | | | | 128/205.11 |

(Continued)

FOREIGN PATENT DOCUMENTS

| DE | 3720815 A1 | 1/1988 |
| DE | 102010005812 A1 | 7/2011 |

(Continued)

OTHER PUBLICATIONS

English Machine Translation of DE102010005812A1.

(Continued)

*Primary Examiner* — Kiran B Patel
(74) *Attorney, Agent, or Firm* — Vichit Chea; King & Schickli PLLC

(57) ABSTRACT

A damper for a storage compartment closure includes a bellows chamber and damper air passage structures each configured to provide an air volume intake during a bellows chamber extension that is less than an air volume expulsion during a bellows chamber compression. One damper air venting structure is a valve having a translatable lid including an aperture defined therethrough. A bellows chamber air pressure differential maintains the translatable lid in a closed configuration during the bellows chamber extension and in an open configuration during the bellows chamber compression. Another damper air venting structure is at least one bellows chamber vent including a cover configured whereby a bellows chamber extension incrementally transitions the cover to a closed configuration.

7 Claims, 4 Drawing Sheets

(56) References Cited

U.S. PATENT DOCUMENTS

| | | | | |
|---|---|---|---|---|
| 4,815,574 A * | 3/1989 | Taylor | | F16F 9/361 |
| | | | | 188/269 |
| 5,275,456 A * | 1/1994 | Ishii | | B60R 7/06 |
| | | | | 16/85 |
| 5,333,845 A * | 8/1994 | Seiichi | | E05F 3/02 |
| | | | | 267/70 |
| 5,845,621 A * | 12/1998 | Robinson | | F02M 55/025 |
| | | | | 123/456 |
| 6,062,352 A | 5/2000 | Shinozaki et al. | | |
| 6,332,602 B1 * | 12/2001 | Oishi | | F16F 13/002 |
| | | | | 267/118 |
| 6,857,675 B2 * | 2/2005 | Kurachi | | B60R 7/06 |
| | | | | 224/483 |
| 6,951,283 B2 * | 10/2005 | Savoie | | B65D 43/24 |
| | | | | 206/443 |
| 7,064,285 B2 * | 6/2006 | Ichimaru | | E05F 1/1066 |
| | | | | 200/293 |
| 7,065,829 B2 * | 6/2006 | Okabayashi | | B60R 7/06 |
| | | | | 16/354 |
| 7,281,704 B2 * | 10/2007 | Salice | | E05F 5/08 |
| | | | | 188/297 |
| 7,527,166 B2 * | 5/2009 | Kondo | | B60R 11/00 |
| | | | | 220/825 |
| 7,661,741 B2 * | 2/2010 | Takai | | B60R 7/04 |
| | | | | 296/37.1 |
| 7,823,709 B2 * | 11/2010 | Beck | | F16F 9/38 |
| | | | | 188/322.12 |
| 7,975,994 B2 * | 7/2011 | Born | | F16F 9/0218 |
| | | | | 188/284 |
| 8,051,534 B1 * | 11/2011 | Luca | | E05F 3/02 |
| | | | | 16/66 |
| 8,146,227 B2 * | 4/2012 | Schmitz | | B60R 5/003 |
| | | | | 224/486 |
| 8,307,505 B2 * | 11/2012 | Harada | | B60R 7/06 |
| | | | | 16/293 |
| 8,308,189 B2 * | 11/2012 | Matsushima | | B60R 21/206 |
| | | | | 180/90 |
| 8,336,166 B2 * | 12/2012 | Kim | | E05F 5/006 |
| | | | | 16/82 |
| 8,516,748 B2 * | 8/2013 | Tensing | | B60R 13/043 |
| | | | | 292/1 |
| 8,955,805 B2 * | 2/2015 | Savian | | B64D 11/0015 |
| | | | | 244/118.5 |
| 9,132,751 B2 * | 9/2015 | Ficyk | | B60N 2/4858 |
| 9,162,617 B2 * | 10/2015 | Savian | | B64D 11/0015 |
| 9,297,195 B2 * | 3/2016 | Berry, Jr. | | E05F 5/00 |
| 9,382,965 B2 * | 7/2016 | Zhang | | E05F 3/14 |
| 9,387,809 B2 * | 7/2016 | Simon | | B60R 7/06 |
| 9,562,599 B2 * | 2/2017 | Castillo | | F16H 53/02 |
| 2009/0079215 A1 * | 3/2009 | Shirase | | E05F 1/10 |
| | | | | 296/37.12 |
| 2016/0169251 A1 * | 6/2016 | Prouzet | | B64C 1/1407 |
| | | | | 74/99 R |

FOREIGN PATENT DOCUMENTS

| | | |
|---|---|---|
| JP | 58164452 A | 9/1983 |
| JP | 2002317846 A | 10/2002 |
| KR | 910008781 B1 | 10/1991 |
| KR | 100209491 B1 | 7/1999 |

OTHER PUBLICATIONS

English Machine Translation of DE3720815A1.
English Machine Translation of JP2002317846A.
English Machine Translation of JP58164452A.
English Machine Translation of KR100209491B1.
English Machine Translation of KR910008781B1.

* cited by examiner

BELLOWS SPRING DAMPER

TECHNICAL FIELD

This disclosure relates generally to motor vehicle storage compartments, and more particularly to an improved storage compartment door damper.

BACKGROUND

Various storage compartments are provided in the modern motor vehicle for user convenience in holding items, including glove compartments, overhead storage bins, center console bins, door-mounted bins, and others. Such storage compartments typically include a closure of some type to allow the contents of the storage compartments to be hidden from sight, and to prevent inadvertent dislodgement of the contents from the storage compartment interior.

Such storage compartment closures are typically hingedly configured to open by a pivoting mechanism, allowing the closure to pivot outwardly from the storage compartment opening to allow access to the storage compartment interior. Particularly in the case of storage compartments that are defined by a rotating bin wherein the bin structure itself defines the closure, items contained in the storage compartment actually rest on the closure portion when the compartment is closed. On opening, the weight of the items may cause the rotating bin to swing open too rapidly, potentially striking a vehicle occupant and/or discharging the storage compartment contents inadvertently. Similar issues may exist in other storage compartment designs where the closure is particularly heavy or where items may shift to rest against the closure.

For this reason, storage compartments often include a damper mechanism to control a rate of opening/closing of the closure. Example damper mechanisms known in the art include string dampers, rack dampers, bellows dampers, hydraulic/pneumatic cylinders, and others. However, conventional damper systems, while generally effective for their intended purpose, typically include a number of components which contribute to increased mechanism complexity and cost, and potentially to reduced reliability. Moreover, conventional damper mechanisms are designed for one-way operation, that is, assist in reducing a rate of opening of a storage compartment closure but do not in any way influence closure closing. This can be an issue with particularly heavy closures or rotating bin-type storage compartments wherein as summarized above the storage bin compartment also serves as the closure, and carries the weight of any items stored in the compartment.

Accordingly, a need for improved damper mechanisms is identified. The present disclosure relates to a damper for a storage compartment closure. Advantageously, the damper is simple in construction and contributes to decreasing rate of translation of a storage compartment closure from a closed position to an open position. In turn, the described damper assists in returning the closure from the open position to the closed position.

SUMMARY

In accordance with the purposes and benefits described herein, in one aspect a damper for a storage compartment closure is described, comprising a bellows chamber and a plurality of damper air passage structures each configured to provide an air volume intake during a bellows chamber extension that is less than an air volume expulsion during a bellows chamber compression. In embodiments, the plurality of damper air passage structures includes a valve comprising a translatable lid having an aperture defined therethrough. A bellows chamber air pressure differential maintains the translatable lid in a closed configuration during the bellows chamber extension and in an open configuration during the bellows chamber compression.

In embodiments, the translatable lid and aperture are configured whereby a bellows chamber air volume intake during the bellows chamber extension is less than a bellows chamber air volume expulsion during the bellows chamber compression.

In embodiments, the plurality of damper air passage structures further includes at least one adaptive bellows chamber vent. The at least one bellows chamber vent in an embodiment comprises an aperture dimensioned whereby a bellows chamber air pressure differential maintains the aperture in a closed configuration during the bellows chamber extension and in an open configuration during the bellows chamber compression.

In another aspect, vehicle storage compartments including at least one damper as described above are provided.

In the following description, there are shown and described embodiments of the disclosed damper. As it should be realized, the damper is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed damper, and together with the description serve to explain certain principles thereof. In the drawing.

Reference will now be made in detail to embodiments of the disclosed damper, examples of which are illustrated in the accompanying drawing figures.

DETAILED DESCRIPTION

Preliminarily, the presently described damper is described in the context of a rotating bin-type storage compartment for a vehicle, for example a rotating bin-style glove compartment. However, the skilled artisan will appreciate that the damper is readily adapted for use with any closure for a storage compartment. Accordingly, the descriptions and drawings will not be taken as limiting in this respect.

Figure 1:
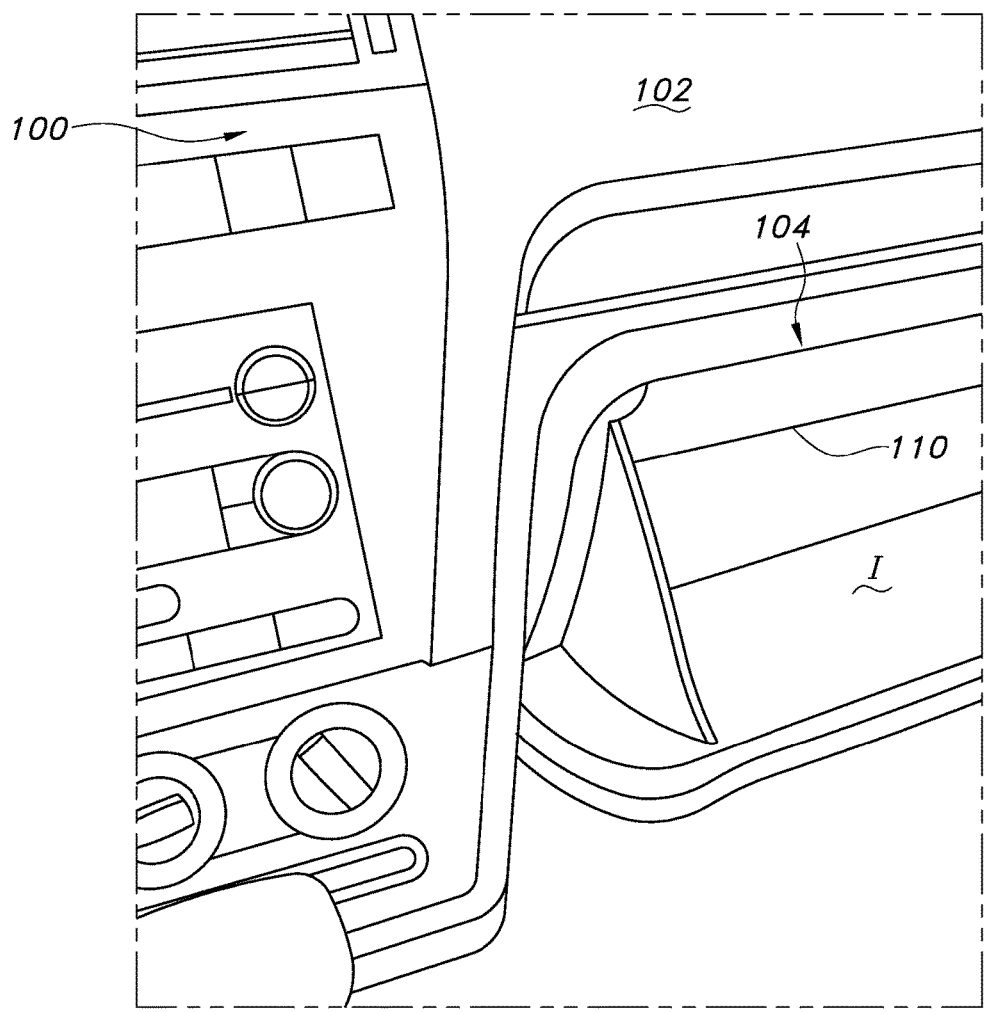
FIG. 1 depicts a prior art rotating bin-type glove compartment.

FIG. 1 illustrates a vehicle 100 including a dash panel 102 wherein is mounted a conventional rotating bin-style glove compartment 104. As shown, the glove compartment 104 includes a front wall 106 serving as a closure panel, side walls 108, and optionally a rear wall 110 in combination defining the storage compartment in which items I can be placed. As shown in the drawing figure, the full weight of items I rests on the front wall/closure 106. Disadvantageously, this weight may cause the glove compartment 104 to open too quickly, potentially striking an occupant of the vehicle seat disposed nearest the compartment. In turn, the weight of items I may hamper returning the glove compartment 104 to the closed position.

Figure 2:
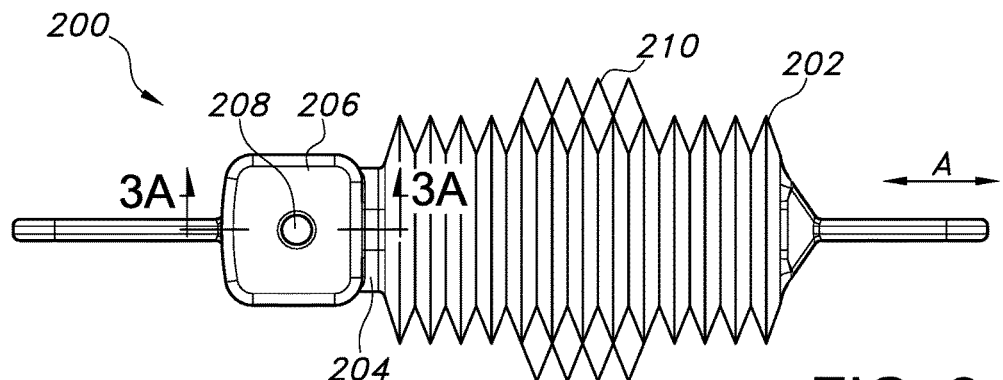
FIG. 2 depicts a bellows-type damper according to the present disclosure.

To solve this and other problems, with reference to FIG. 2 there is shown a damper 200 for a storage compartment closure. The damper 200 is a bellows-type damper, including a bellows chamber 202 and one or more structures regulating a volume of air respectively taken in or expelled by the bellows chamber during extension and compression. One such structure is a damper valve 204 for controlling air intake and expulsion during extension and compression (arrow A), respectively, of the bellows chamber. The damper valve 204 includes a damper valve lid 206 having an aperture 208 defined therethrough. The damper 200 further includes one or more adaptive bellows chamber vents 210, the structure and purpose of which will be described in detail below.

Figure 3A:
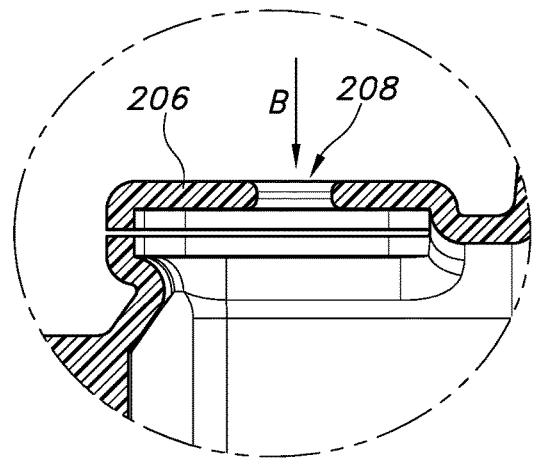
FIG. 3A shows a valve for the damper of FIG. 2 during bellows extension.
Figure 3B:
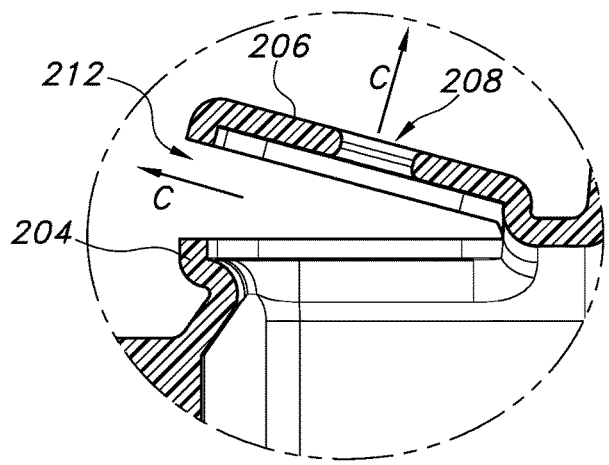
FIG. 3B shows the valve of FIG. 3A during bellows compression.

As shown in FIGS. 3A-3B, the damper valve 204 is configured to permit different volumes of air flow during extension and compression of the damper 200. During damper 200 extension, the force of air traveling into the bellows chamber 202 creates an air pressure differential that maintains the damper valve lid 206 in a closed configuration, whereby air can only pass through the damper valve lid aperture 208 (arrow B). This air intake restriction increases the amount of force required to translate the bellows chamber 202 and thereby the damper 200 to full extension, thus slowing the rate at which the damper extends. This likewise slows the rate at which a storage compartment closure 106 and/or storage compartment 104 (not shown in this view) operatively associated with the damper 200 will open.

In turn, during damper 200 compression air exiting the bellows chamber 202 (arrows C) creates an air pressure differential that forces the damper valve lid 206 to open (FIG. 3B), creating less resistance to damper compression. That is, whereas air can only enter the bellows chamber 202 via the damper valve lid aperture 208 during damper 200 extension, during damper compression air exits through the damper valve lid aperture 208 and through a damper valve opening 212 exposed on opening of the damper valve lid 206. This decreases the amount of resistance encountered by a user in translating the storage compartment closure 106 and/or storage compartment 104 (not shown in this view) operatively associated with the damper 200, and so reduces the amount of force the user must apply to close the storage compartment.

Figure 4A:
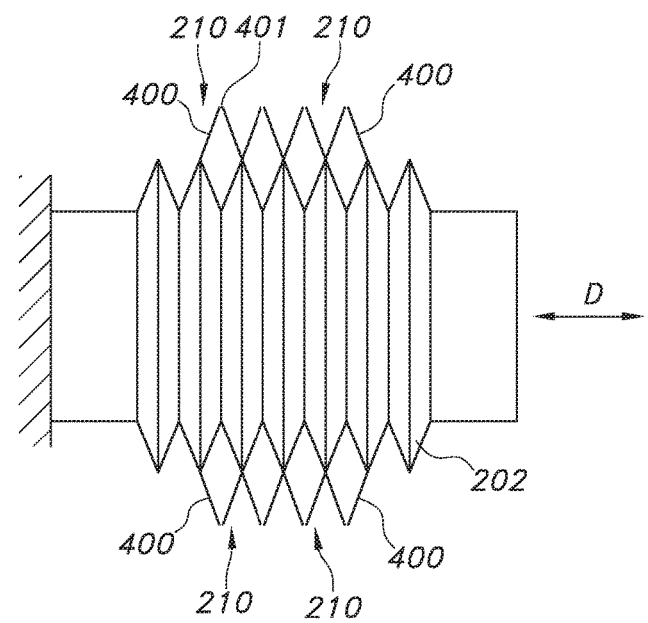
FIG. 4A shows a bellows chamber adaptive vent for the damper of FIG. 2 during bellows extension.
Figure 4B:
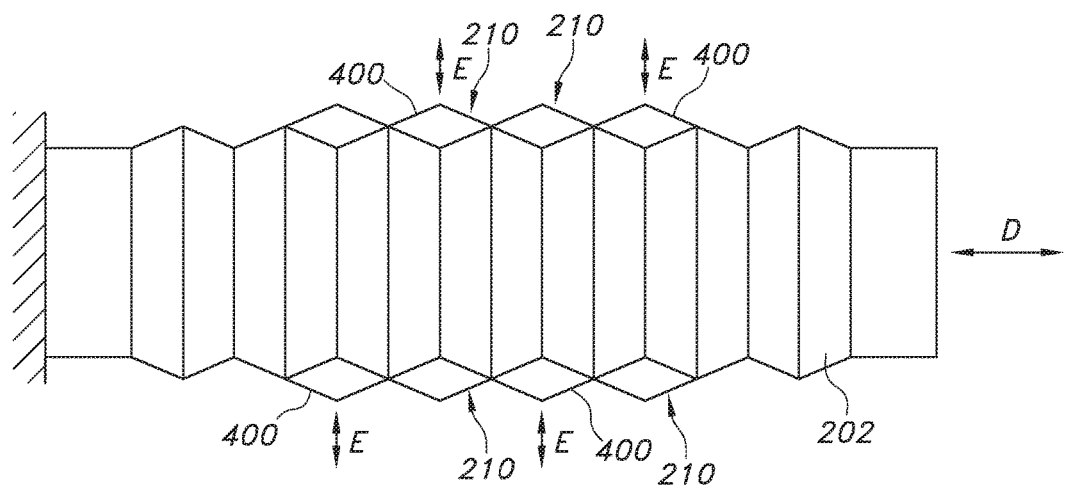
FIG. 4B shows the bellows chamber adaptive vent of FIG. 4A during bellows compression.

A representative adaptive bellows chamber vent 210 for the bellows chamber 202 is shown in FIGS. 4A-4B. The adaptive bellows chamber vent 210 includes a vent cover 400 defining a venting aperture 401 which selectively allows movement of different volumes of air therethrough during bellows chamber 202 extension and compression. As shown in FIG. 4A, in the fully compressed state bellows chamber 202 the adaptive bellows chamber vent 210 venting aperture 401 is in an open configuration, allowing the most air movement therethrough.

As the bellows chamber 202 is translated to the extended configuration (FIG. 4B; arrow D), the extension of the bellows chamber incrementally translates the bellows chamber vent cover 400/venting aperture 401 to a closed configuration (arrows E), incrementally restricting or preventing air movement therethrough. This additional air intake restriction further increases the amount of force required to translate the bellows chamber 202 and thereby the damper 200 to full extension, thus slowing the rate at which the damper extends. This likewise slows the rate at which a storage compartment closure 106 and/or storage compartment 104 (not shown in this view) operatively associated with the damper 200 will open.

It will be appreciated that as the bellows chamber 202 is translated from the compressed to the extended configuration the transition of the vent cover 400/venting aperture 401 from the open configuration of FIG. 4A to the closed configuration of FIG. 4B is not instantaneous. Rather, there is a time period during which the intake of air into the interior of the bellows chamber 202 through the adaptive vent 210 steadily decreases as the vent cover 400/venting aperture 401 transitions from fully open to fully closed. Thus, the resistance to bellows chamber 202 extension steadily increases throughout the extension stroke of the bellows chamber, likewise steadily increasing resistance to storage compartment closure 106 and/or storage compartment 104 (not shown) opening as the closure reaches its furthest extension.

This process reverses during bellows chamber 202 compression, incrementally opening the adaptive bellows chamber cover 400/venting aperture 401 and allowing increased airflow therethrough. This creates less resistance to damper 200 compression, which decreases the amount of resistance encountered by a user in translating the storage compartment closure 106 and/or storage compartment 104 (not shown in this view) operatively associated with the damper 200, and so assists the user in closing the storage compartment.

Figure 5:
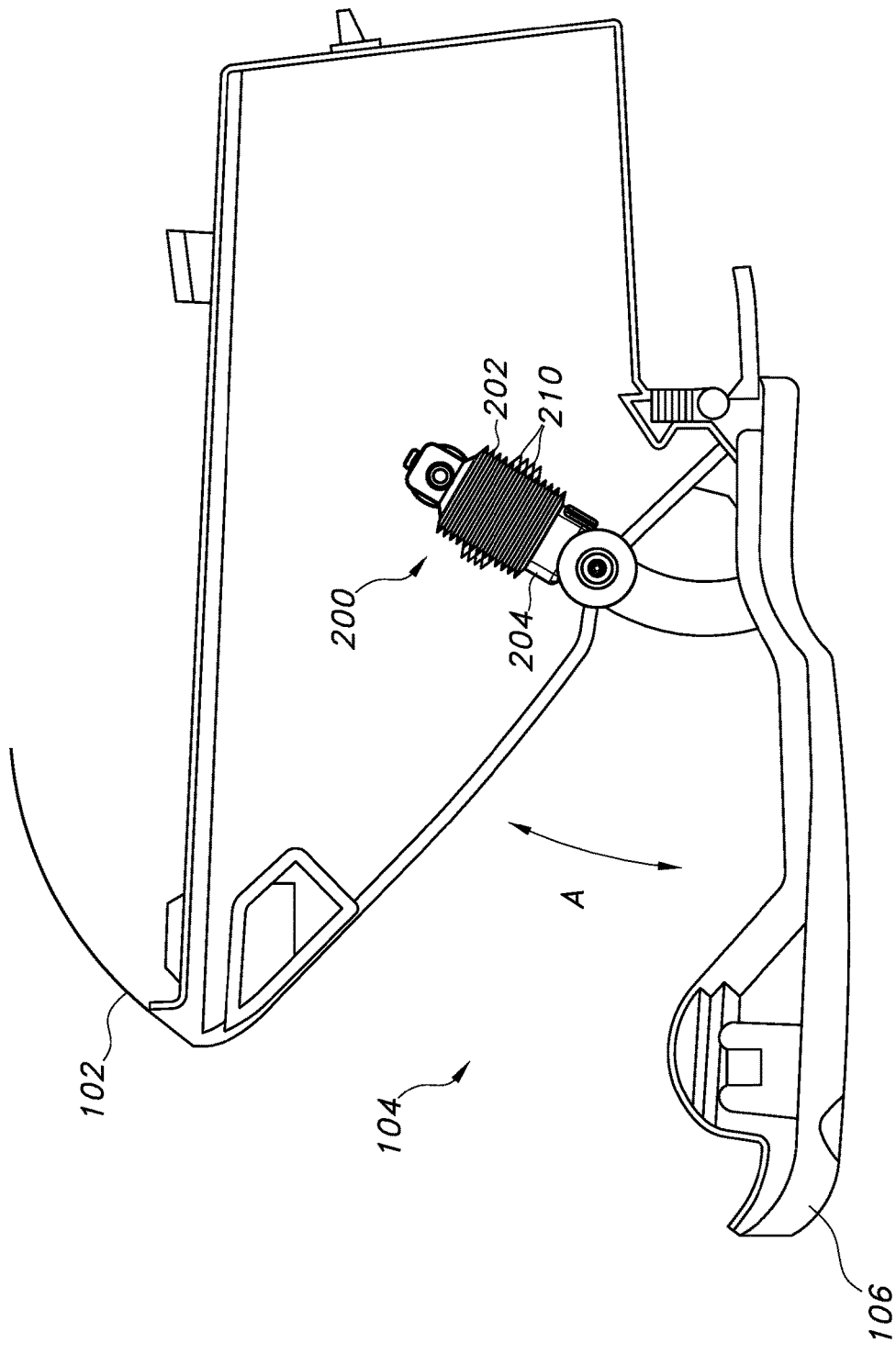
FIG. 5 shows a rotating bin-type glove compartment including the damper of FIG. 2.

In use, at least one damper 200 is operatively associated with a pivoting storage compartment as shown in FIG. 5. As described above, the damper 200 will, by the structures discussed above, increase the amount of force required to open the closure 106, thus slowing and smoothing the rate of opening and also preventing inadvertent impact of the closure with a vehicle occupant and/or preventing inadvertent dislodgement of items held within the storage compartment 104. Conversely, by the structures discussed above the amount of force required to translate the closure 106 to a closed position is reduced, improving occupant ease of use and convenience.

The benefits of the presently disclosed damper are apparent. The structure is simple and uncomplicated, and indeed may be manufactured as a single molded piece, thus reducing complexity of manufacture as well as use, and potentially increasing reliability. Because of its one-piece design, weight is reduced. In an embodiment, the damper valve lid aperture 400 defines a cross-sectional dimension of about 3 mm. However, the skilled artisan will appreciate that the volume of air passing through the damper valve 204 may be altered as needed by changing a size dimension of the valve lid aperture 208 and/or the bellows chamber vent aperture 400. Thus, the opening resistance of the damper 200 is tunable, and may be altered as necessary according to the weight of a storage compartment closure 106, an anticipated weight of items to be stored in the storage compartment 104, a size dimension of the bellows chamber 202, and/or other factors.

Obvious modifications and variations are possible in light of the above teachings. All such modifications and variations are within the scope of the appended claims when interpreted in accordance with the breadth to which they are fairly, legally and equitably entitled.

What is claimed:

1. A damper for a vehicle storage compartment, comprising a bellows chamber and a plurality of damper air passage structures each configured to provide an air intake during a bellows chamber extension that is restricted compared to an air expulsion during a bellows chamber compression.

2. The damper of claim 1, wherein the plurality of damper air passage structures includes a valve comprising a translatable lid having an aperture defined therethrough.

3. The damper of claim 2, wherein a bellows chamber air pressure differential maintains the translatable lid in a closed configuration during the bellows chamber extension and in an open configuration during the bellows chamber compression.

4. The damper of claim 2, wherein the translatable lid and aperture are configured whereby a bellows chamber air intake during the bellows chamber extension is restricted compared to a bellows chamber air expulsion during the bellows chamber compression.

5. The damper of claim 2, wherein the plurality of damper air passage structures further includes at least one bellows chamber vent.

6. The damper of claim 5, wherein the at least one bellows chamber vent comprises a vent cover configured whereby a bellows chamber extension incrementally translates the vent cover to a closed configuration.

7. The damper of claim 6, wherein a bellows chamber compression incrementally translates the vent cover to an open configuration.

* * * * *